US006493816B1

United States Patent
Munroe et al.

(10) Patent No.: US 6,493,816 B1
(45) Date of Patent: *Dec. 10, 2002

(54) METHOD AND APPARATUS FOR ENCAPSULATING ADDRESS TRANSLATION FOR SHARED PERSISTENT VIRTUAL STORAGE

(75) Inventors: Steven Jay Munroe, Rochester, MN (US); John Gerard Nistler, Rochester, MN (US); James W. Stopyro, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/050,831

(22) Filed: Mar. 30, 1998

(51) Int. Cl.[7] .............................................. G06F 12/00
(52) U.S. Cl. ....................... 711/709; 711/202; 711/206; 711/207; 707/102; 707/103
(58) Field of Search ......................... 711/202–207, 212, 711/209; 707/102, 103; 709/213, 214

(56) References Cited

U.S. PATENT DOCUMENTS

| 5,034,880 A | * | 7/1991 | Fong et al. ................. 712/234 |
| 5,742,826 A | * | 4/1998 | Endicott et al. ............. 709/303 |
| 5,757,796 A | * | 5/1998 | Hebb ........................... 370/393 |
| 6,055,617 A | * | 4/2000 | Kingsbury ................... 711/203 |
| 6,298,428 B1 | * | 10/2001 | Munroe et al. .............. 711/203 |
| 6,301,582 B1 | * | 10/2001 | Johnson et al. ............. 707/103 |
| 6,330,709 B1 | * | 12/2001 | Johnson et al. ................ 717/1 |

OTHER PUBLICATIONS

"Java(TM) Persistence via Persistent Virtual Storage" by Johnson et al., Jul. 7, 1997, pp. 1–16.

* cited by examiner

*Primary Examiner*—Than Nguyen
(74) *Attorney, Agent, or Firm*—S. Jared Pitts; James R. Nock (57) ABSTRACT

A preferred embodiment of the present invention provides an intelligent reference object (IRO), which is used to encapsulate address translation between shared address space (SAS) addresses and native system addresses. The IRO works with a shared persistent virtual storage system that provides address translation between SAS addresses and the underlying system. By encapsulating these addresses translations in an IRO, the preferred embodiment provides the ability to create and share persistent objects using single level store semantics. When a client accesses the data in a persistent object, the IRO corresponding to the persistent object provides any address translation and indirection needed to perform the access.

24 Claims, 6 Drawing Sheets

METHOD AND APPARATUS FOR ENCAPSULATING ADDRESS TRANSLATION FOR SHARED PERSISTENT VIRTUAL STORAGE

RELATED APPLICATIONS

This application is related to the following U.S. patent applications: "Shared Persistent Objects", Ser. No. 09/050,821, filed on Mar. 30, 1998, issued Oct. 9, 2001 as U.S. Pat. No. 6,301,582; "Virtual Machine Implementation for Shared Persistent Objects", Ser. No. 09/050,832, filed on Mar. 30, 1998, issued Dec. 11, 2001 as U.S. Pat. No. 6,330,709; and "Method and Apparatus for Shared Persistent Virtual Storage on Existing Operating Systems", Ser. No. 09/050,830, filed on Mar. 30, 1998, issued On Oct. 2, 2001 as U.S. Pat. No. 6,298,428 that are hereby incorporated by reference.

BACKGROUND OF THE INVENTION

1. Technical Field

This invention generally relates to virtual storage and more specifically relates to a method and apparatus for providing shared persistent virtual storage on 32 bit operating systems.

2. Background Art

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

Computer systems typically include operating system software that controls the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Object-oriented programming based on an object model is a new way of creating computer programs that has become very popular over the past several years. The goal of using object-oriented programming is to create small, reusable sections of program code known as objects that can be quickly and easily combined and re-used to create new programs. By creating and re-using a group of well-tested objects, a more stable, uniform, and consistent approach to developing new computer programs can be achieved.

One particular object-oriented programming language is Java which is specifically designed to create distributed object systems. Java offers many features and advantages that makes it a desirable programming language to use. First, Java is specifically designed to create small programs, commonly called applets, that can reside on the network in centralized servers, and delivered to the client machine only when needed. Second, Java is an interpreted language. A Java program can be written once and ran on any type of platform that contains a Java Virtual Machine (JVM). Thus, Java is completely platform independent. And third, Java is an object-oriented language, meaning that software written in Java can take advantage of the benefits of object-oriented programming.

One issue in object oriented programming, and Java programing in particular, is object persistence. Typically, when a process ends, all of the references to objects created by the process are lost, and the objects themselves are destroyed. These objects are referred to as transient objects. Persistent objects, as opposed to transient objects, have a lifetime that transcends the lifetime of the process that created them. To make an object persistent, mechanisms must be put in place to allow a persistent object to survive beyond the lifetime of the process from which the object was created so that other processes can access the object. This typically involves the storing of the objects onto permanent storage devices, such as hard disks, optical disks, tape drives, etc.

Many common computer systems use an addressing scheme referred to as the two level storage (TLS) model. The TLS model stores and manipulates data using two systems: a file manager and a virtual memory system. The virtual memory includes the actual memory and a specialized data file called a swap file. The virtual memory system controls the allocation of address space to different processes. The file manager stores and retrieves data from the permanent storage devices in the form of files.

One benefit to using the TLS model is that it provides large amounts of address space to fixed size address machines. This large address space is useful for storing large amounts of information. However, the TLS models does not provide a way for storing persistent objects in a way that can be efficiently used by a computer system.

In particular, in a TLS system persistent data, such as persistent objects, must be stored in files on a disk or other storage medium by the file manager. When a process needs to access a persistent object, the process must contact the file manager which locates the persistent object data in a file on backing store and move a copy of the persistent object data into a memory buffer. The persistent object data must then be reconstructed into a persistent object in memory.

When the data being stored by the TLS model is persistent, several other problems are introduced. For example, persistent objects typically contain many pointers used for sharing data and methods with other objects. When a persistent object is retrieved from backing store and a new runtime representation of the object is created, any internal pointers contained within the persistent object must be converted and rebuilt. Rebuilding persistent objects, and more specifically, converting pointer references contained within persistent objects results in significant overhead on the CPU.

Some TLS systems use externalization techniques to store persistent objects. These techniques pull data from the object and write the externalized data to a data file. When the object is needed again, the data must be read in by the file system and the persistent object recreated using state data. This processes requires reading from the file system to a memory buffer, and copying data from the memory buffer to the object. This also creates significant unwanted CPU overhead.

Another addressing scheme is the single level storage (SLS) model. The SLS system maps all of the storage mediums, including persistent storage mediums such as hard drives, into a single address space. This makes the entire data storage system into a single "virtual memory" that is accessed directly using a single, process independent, address space. In an SLS system, persistent data from the permanent storage mediums can be easily copied to real memory using the virtual memory addressing.

The SLS model is very efficient means of making and manipulating persistent objects because it reduces the amount of system overhead to load persistent objects into memory. As mentioned, when a process needs a persistent object, the persistent object is copied from persistent storage and into real memory. This involves creating only one copy rather than the two copies created by the TLS model. Because pointer references are process independent, SLS system allows persistent objects, including pointer references contained within persistent objects, to be moved into and from persistent storage without requiring any rebuilding of the persistent object. When a process needs to access a persistent object, the SLS model simply moves this persistent object from the backing store into memory. Stated another way, the SLS model eliminates the need to create a runtime representation of a persistent object since pointer references contained within the persistent object always remain valid. Another advantage to SLS systems is that pointers to objects are process independent. This allows easy sharing of persistent objects between multiple processes.

The SLS model has been successfully implemented using 48 and 64 bit memory addresses since 1980 (IBM System/38 and AS/400). However, many business applications today run on desktop PC's which have 32 bit memory addresses. Because a SLS system maps all data storage into a single virtual memory, a very large address space is required. A 32 bit SLS system would simply not be large enough to store the enormous amounts of data generated by large business applications. Thus, programmers and computer users of commodity 32-bit systems continue to have no easy way to provide object persistence.

Without a more efficient mechanism for providing efficient creation, access and sharing of persistent objects in interpreted computer systems such as Java, the computer industry will continue to not realize the full potential of the these systems.

SUMMARY OF THE INVENTION

A preferred embodiment of the present invention provides an intelligent reference object (IRO), which is used to encapsulate address translation between shared address space (SAS) addresses and native system addresses. The IRO works with a shared persistent virtual storage system that provides address translation between SAS addresses and the underlying system. By encapsulating these addresses translations in an IRO, the preferred embodiment provides the ability to create and share persistent objects using single level store semantics. When a client accesses the data in a persistent object; the IRO corresponding to the persistent object provides any address translation and indirection needed to perform the access.

The foregoing and other features and advantages of the present invention will be apparent from the following more particular description of the preferred embodiment of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

BEST MODE FOR CARRYING OUT THE INVENTION

The present invention relates in general to object-oriented programming techniques. For those individuals who are not generally familiar with object-oriented programming, the Java programming language, or single level storage (SLS) and two level storage (TLS) models, the Overview section below presents many of the basic concepts and terminology that will help to understand the invention. Individuals skilled in the art of object-oriented programming may wish to skip this section and proceed directly to the Detailed Description section of this specification.

1. Overview

Object-oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

There are many computer languages available today that support object-oriented programming. For example, Smalltalk, Object Pascal, C++ and JAVA are all examples of languages that support object-oriented programming to one degree or another.

One issue in object oriented programming is object persistence. Persistent objects, as opposed to transient objects, have a lifetime that transcends the lifetime of the program that created them. To make an object persistent, mechanisms must be put in place to allow the object to survive the process that creates it so it can be accessed by other processes.

One common approach to providing persistence is the use of a use a persistent mixin class of objects. In this approach all objects for which persistence is desired must have this persistent mixin class as a superclass somewhere in their class's inheritance lattice. Because a mixin class is required in the inheritance lattice, this method of providing object persistence cannot be used to provide persistence in a way that is orthogonal (i.e., independent) to the class of the object. Because the object persistence is not orthogonal to class, the applications in which it can be used are limited.

Another approach which provides object persistence is "externalization". Externalization is the means or protocol used in object-oriented programming for transferring data out of an object. In essence the "state data" that defines the attributes of an object are "externalized", or written out of the object, into a different format that is easily stored in the local data store. When the object is needed again, the externalized state, data is internalized into an object, creating an exact copy of the object as it previously existed. Additionally, any pointers in the persistent objects must be accounted for during externalization. This requires converting the pointer to an object "name" for storage, and then turning it back when the externalized object is recreated. All these process required for externalizing the state data for storage, dealing with internal pointers, and then internalizing it again when needed takes an excessive amount of processing time and thus slows performance in a way that can be unacceptable in many applications.

When persistence of an object is independent of its class or type, the persistence is said to be orthogonal to class. With an orthogonal persistence system, any object of any class can be made persistent. Thus, no special "persistence object base class" with special methods is required to be in the objects superclass lattice for the object to be persistent. Furthermore, all the procedures and methods defined by the superclass lattice are available on each object regardless of whether that object is persistent or transient.

Java Programming Language

Java is a modern object-oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM).

Java source code is compiled into bytecodes that can be interpreted to run on any type of platform. These bytecodes are platform neutral and must be used in conjunction with a Java runtime environment. The Java runtime environment provides the functionalities necessary to interpret bytecodes for use on a particular type of platform. The compiled Java source code must be used in conjunction with a Java runtime environment.

The JVM model is supported by most computer vendors, thereby allowing a software vendor to have access to hardware and software systems produced by many different companies. Finally, Java is an object-oriented language, meaning that software written in Java can take advantage of the benefits of object-oriented programming techniques. As in other object-oriented systems, operations in Java are performed by one object calling a method on another object. These objects can reside locally on the same machine or on separate JVM's physically located on separate computers or systems.

One particular problem associated with Java is object persistence. As mentioned, persistent objects are objects which exist beyond the lifetime of the process from which they were created. Java currently requires the use of mixin class or other methods that are not transparent to the user. Thus, the problems associated with creating, using and storing persistent objects in Java are significant.

Memory and File Systems

Modern computers use a variety of methods to manage, access and store data in computer systems. Computer systems typically contain two main types of data storage, transient data storage such as DRAM, and persistent storage such as hard disk drives, optical drives and such. Several systems exist for managing the flow of information between these storage mediums and the processors that execute the programs.

Most commodity computer systems today, such as IBM compatible personal computers running IBM's OS/2 or Microsoft's Windows, use a system called two-level store (TLS). TLS systems use a file system for storing data on permanent storage and a virtual memory system for running application processes. Included in the virtual memory system of TLS systems is a specialized data file called a swap file. The swap file is used as "extra memory" to store data for application processes that are too large to be loaded into the limited amount of "real memory".

In TLS systems a file manager keeps a directory that relates the name of a file to the location on the disk where the data for the file is stored. The file manager provides an interface to allow programs to "read" a file. The data from the file is then copied into memory, which include the real memory and the swap file. There, the data can be used and manipulated. When the program is finished with the data, a "write" operation is performed, which causes the data to be moved from the virtual memory back to the file on the disk.

In most TLS virtual memory systems, each application process is assigned its own virtual address space. For example, when the central computer creates a first process, the underlying operating system allocates a virtual address space for use by this process only. As the process executes the operating system will allocate real memory chunks for usage by the process. As each real chunk is allocated, the operating system will also create a mapping of the process virtual addresses to real memory. This procedure would be repeated for other application processes running on the same computer. As the real memory becomes over committed, the contents of the real memory can be temporarily moved to the swap file and the real memory portion reused by other processes.

When an application processes is started, the data for the application must first be moved from its permanent storage file to the virtual memory system. This typically involves copying a portion of the application into real memory and a portion of the application into the swap file. The application then runs from the real memory, using its virtual addressing while the operating system moves portions of the application between real memory and the swap file as needed.

This system does have its advantages. For example, because the operating system hides the complexity of real memory system and swap file from the application, it is easier to write applications. Second, it isolates each process from all others so that bugs in one process do not usually cause bugs in other processes.

The system unfortunately also has several disadvantages. One of these is the context dependent nature of the virtual addresses. Because each application uses a virtual address range that has no meaning to other applications, addresses cannot be easily shared between applications. For example, only the first application process could access its allocated chunk of memory, but cannot access data in a second chunk of memory which belongs to the second process.

This context dependency is especially troubling for persistent objects, which by definition can outlive the application processes which created them. Persistent objects typically contain address pointers which reference valid information when created. However, as mentioned, the TLS model creates memory for each process and destroys the memory when the process is eliminated. Therefore, when a persistent object is created, the pointers contained within the object remain valid only as long as the application which created the persistent object is in memory. Once the persistent object is saved onto backing store, the meaning of the pointers within the object are lost.

In order to avoid this problem, externalization techniques are required to convert the pointer to an object "name" when storing the persistent object. When the persistent object is retrieved from backing store and a new runtime representation of the object is created, the object name must be converted to a new valid pointer. This process of creating a new runtime copy of the persistent objects and converting pointer references contained within persistent objects results in significant overhead on the CPU.

The single level storage (SLS) model was developed in response to the memory management problems described above. The SLS system maps all of the data storage mediums, generically referred to as backing store, into a single large address space. The backing store can include any type of local storage medium, such as magnetic and optical disk drives, and can also include the storage mediums of multiple computer systems connected by large networks. In the SLS model each byte of data contained within this large backing store area is addressed using its own unique, context independent virtual address. This makes the entire storage system function as a single "virtual memory" with a context independent addressing scheme.

The SLS model is very efficient means of making and manipulating persistent objects because it reduces the amount of system overhead to store and retrieve persistent objects from backing store. In an SLS system, persistent objects, including pointers to other objects contained within the persistent object, can be stored in backing store without modification.

This is allowed because pointers stored in persistent objects in an SLS system are context independent. Because all applications share the same large virtual address space, all pointers to objects remain valid regardless of their context. This eliminates the need for converting pointer references to "names" when storing persistent objects.

Thus, no separate steps are required to store persistent objects to backing store, such as those required to externalize object data in TLS systems. Likewise, no separate steps are needed to retrieve persistent objects from backing store. When a persistent object is needed from backing store, the persistent object can be simply copied from backing store into a memory buffer, with no recreation required. Thus, SLS systems eliminate the need to create different runtime and storage versions of persistent objects. Because persistent objects can be simply copied from backing store to/from memory as needed, processor overhead in dealing with persistent objects is significantly reduced.

Furthermore, because all address pointers are context independent, they can be easily shared between processes. In contrast, the context dependent pointers of TLS are valid only in the processes that created them and cannot be shared without some difficultly.

The SLS model has been successfully implemented using 48 and 64 bit memory addresses since 1980 (IBM System/38 and AS/400). However, many business applications today run on desktop PC's which have 32 bit memory addresses. Because a SLS system maps all data storage into a single virtual memory, a very large address space is required. A 32 bit SLS system would simply not be large enough to store the enormous amounts of data generated by large business applications. Thus, programmers and computer users of commodity 32-bit systems cannot use the SLS model and continue to have no easy way to provide object persistence, in whether in Java or other programing environments.

2. Detailed Description

Figure 1:
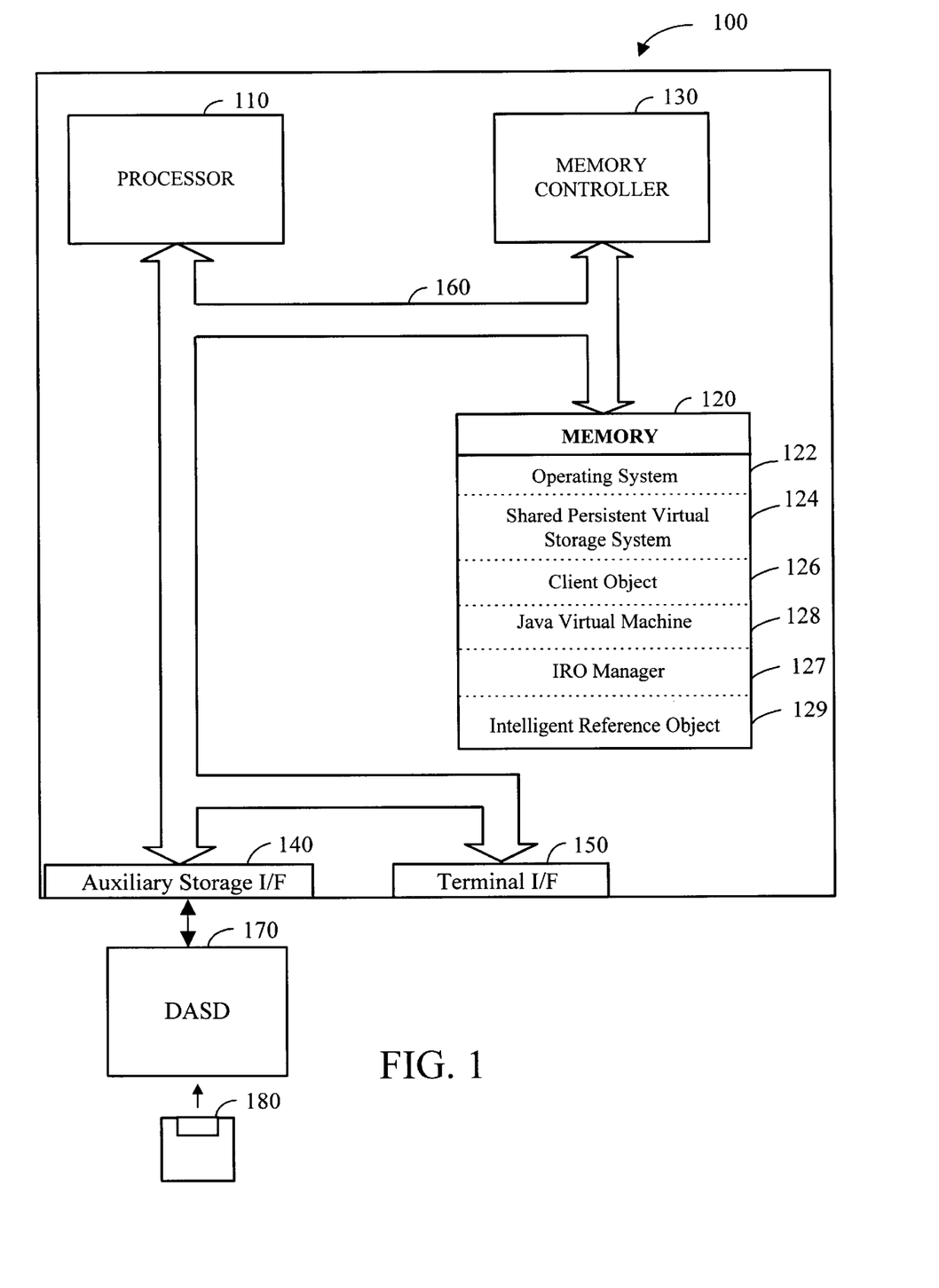
FIG. 1 is a block diagram of a computer system according to a preferred embodiment of the present invention.

Referring now to FIG. 1, a computer system 100 in accordance with a preferred embodiment of the present invention is a standard IBM compatible 32-bit computer system. However, those skilled in the art will appreciate that the method and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer programs within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports-directional communication in a computer-related environment could be used.

In the preferred embodiment, memory 120 suitably includes an operating system 122, a shared persistent virtual storage system 124, at least one client object 126, a virtual machine 128 and at least one intelligent reference object 129. It should be understood that for purposes of this application, in memory 120 is used in its broadest sense, and can include Dynamic Random Access Memory (DRAM), Static RAM (SRAM), flash memory, cache memory, etc. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

It should be noted that the virtual machine 128 is preferably a Java virtual machine, but it could also be a virtual machine for any other interpreted object-oriented language.

The shared persistent virtual storage system 124 provides a mechanism for creating and managing a large logical virtual address space, called a shared address space (SAS), on existing 32-bit systems. The shared persistent virtual storage system 124 accomplishes this by providing an interface layer between client processes using the SAS addresses and the underlying system. The shared address space provides the ability to create and share persistent objects with single level store semantics. The preferred embodiment does this mapping the shared address space to backing store as needed, and by implicitly moving portions of SAS data, called pages, between backing storage and main memory as needed by client process. The preferred embodiment then provides a mechanism for translating shared address space addresses into native addresses of the data in the page cache. These address translations are then encapsulated in intelligent reference objects, where they can be used to access data in persistent objects. Thus, the preferred embodiment provides the ability to store data using proven single level storage techniques in commodity 32-bit systems and Java Virtual Machines.

It should be understood that in this application the term shared address space refers to the large address space that allows applications to store persistent data using single level store semantics. Likewise, the term native address as used in this application refers to an address that can be used by the underlying system to retrieve data from the page cache. As such, the native address is typically a 32 bit virtual address as used in the two level store of the underlying system.

In the preferred embodiment, the intelligent reference objects 129 act to encapsulate the translated addresses between shared address space addresses and byte aligned native address of objects, called "target objects" in this application. In the preferred embodiment, these intelligent reference objects 129 are created and cached by an IRO Manager 127. Intelligent reference object 129 preferably provides the methods needed to load or store data directly from the JVM to persistent storage in the shared address space. In particular, all accesses to persistent storage by the JVM (outside of its own internal data structures) are preferably performed through intelligent reference objects. Intelligent reference object 129 also preferably communicates state data changes to the virtual storage manager as needed.

In the preferred embodiment, the shared address space uses large 128 bit virtual addressing to provide single level storage semantics for two-level store systems. Of course the shared address space is not required to be 128 bits, it can be any size large enough to effectively address the needed data using single level store semantics.

Figure 2:
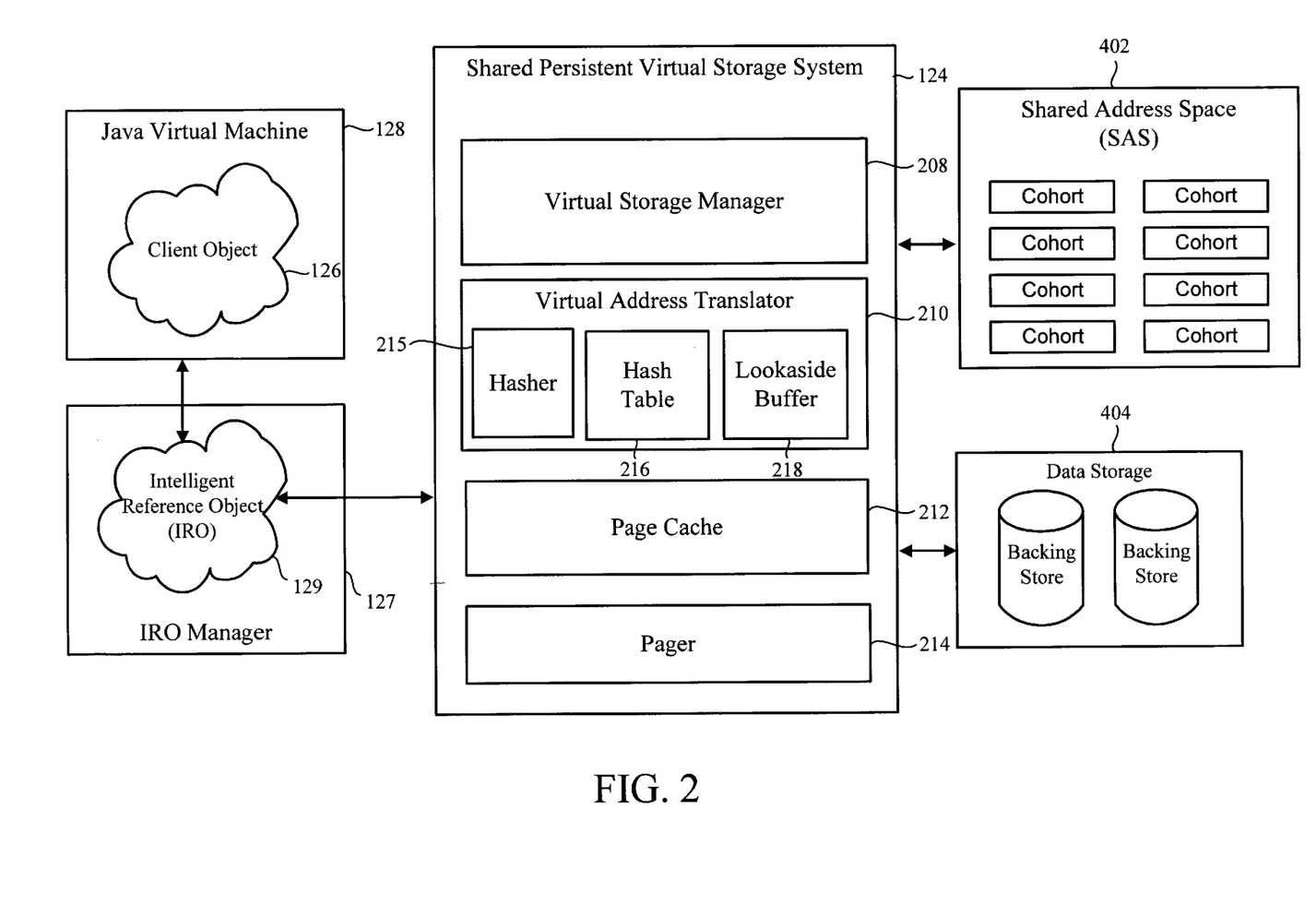
FIG. 2 is a block diagram illustrating a shared persistent storage system and intelligent reference object (IRO) in accordance with the preferred embodiment.

Referring now to FIG. 2, the preferred embodiment shared persistent virtual storage system 124, the Java virtual machine 128, the IRO Manager 127, the intelligent reference object 129 and the client object 126 are schematically illustrated in more detail.

The shared persistent virtual storage system 124 manages a large shared address space (SAS) 402, performs address translations as necessary, and controls the retrieval and storage of SAS data in data storage 404. In accordance with the preferred embodiment, the shared persistent virtual storage system 124 includes a virtual storage manager 208, a virtual address translator 210, a page cache 212, and a pager 214. The virtual storage manager 208 allocates and deallocates portions of the SAS 402 to portions of the data storage 404 as needed. The virtual address translator 210 translates 128 bit SAS addresses to 32 bit native address of the object in the page cache when requested by client objects. The pager 214 moves pages of data between data storage 404 and page cache 212 as needed by client processes.

In the preferred embodiment, the shared address space 402 is segmented into logical subdivisions. These logical subdivisions facilitate administration of the shared address space by allowing different applications to be assigned different portions of the shared address space. Furthermore, these subdivisions facilitate system administration by allowing system administrators to separately define user rights (e.g., who can read objects, who can create objects, who can write objects, who can allocate space) for each subdivision. In particular, the shared address space is subdivided into a plurality of cohorts. In the preferred embodiment where the shared address space is 128 bits, $2^{64}$ cohorts are created with each cohort preferably comprises a 64 bit portion of that shared address space, with each cohort addressing $2^{64}$ bytes of data. Each cohort is then subdivided into a plurality of blocks. Preferably, these blocks can be sized as needed. Each block is then subdivided into a plurality of pages, with each page preferably comprising a 12 bit portion of the shared address space accessing 4096 bytes of data.

To facilitate management of the shared address space 402, a plurality of data structures are provided by the shared persistent virtual storage system 124. These data structures support the logical partitioning of the shared address space into cohorts and blocks. These data structures would preferably include cohort data structures for each created cohort, and block data structures for each created block in the cohorts. The cohort data structures would preferably include pointers to block data structures which reside in the corresponding cohort. The block data structures would preferably include the information needed to retrieve data in the corresponding block from data storage 404. For example, in one embodiment each block containing persistent data is stored as a separate file in the file system of data storage 404. In this case, each block data structure would include the name of the file in which the corresponding block is located. When the pager 214 needs to retrieve a page of persistent data from backing store 404 it retrieves the name of the file containing the page from the corresponding block data structure. The shared persistent storage system 124 can then request the required data from the data storage 404 file system using that file name. It should be noted that the preferred embodiment can be adapted to work with any type of data storage system and their associated file systems When the virtual address translator 210 receives an SAS address to translate it runs the SAS address through hasher 215 to generate a key number n. The hash table 216, preferably a list of pointers to page table entry lists, is then searched to locate the page table entry list in the lookaside buffer 218 corresponding to that key number n. The page table entry list corresponding to that key number n in the lookaside buffer 218 is then searched to determine if requested data is in the page cache 212. If the data is in page cache, a 32 bit address corresponding to the location of the data in the page cache is returned. If the data is not in the page cache, the pager 214 retrieves the page of data in which the requested data is located from the backing store 404 and loads that page into the page cache 212. The 32 bit native address of the data in the page cache 212 can then be returned.

In the preferred embodiment the shared persistent virtual storage system 124 works in a client—server manner, with one shared persistent virtual storage system 124 acting as a server to simultaneously process multiple clients.

In accordance with the preferred embodiment, an intelligent reference object 129 is used to transparently encapsulate SAS to 32 bit address translations for all objects, classes or handle references accessed by the JVM 128. In this application the use of the term "target object" will be used to collectively refer to all the objects, classes and handles referenced through intelligent reference objects. Thus, when a client process makes a request to access a target object, the intelligent reference object 129 encapsulating the correct reference will be provided to facilitate client process access to the target object.

Specifically, field accesses made on target objects are received by the intelligent reference object 129 corresponding to the target object. The intelligent reference object 129 then provides any address translation and indirection needed to allow the field access to be performed on the target object. In the case where the target object is a persistent object stored in the page cache, this involves converting the SAS address to a 32 bit address of the target object in the page cache. This 32 bit address can then be used to direct the method call to the object itself. In the case where the target object is a normal transient object the intelligent reference simply directs the method call to the appropriate location. Thus, the JVM 128 is able to interact with persistent objects in the shared address space and regular transient objects in the same manner.

In the preferred embodiment, an IRO 129 is preferably created for each java object that is accessed by the JVM 128. In particular, IRO's are created for both persistent and normal transient objects. Additionally, for persistent target objects which span more than one page in the page cache, additional secondary-IRO's 129 are created and managed by the primary IRO for each additional page containing target object portions that are currently in the page cache 212.

IRO's for transient and persistent objects preferably shared the same interface, although with different implementations and creation mechanisms reflecting the different nature of their corresponding target objects.

The intelligent reference objects 129 are preferably created and cached by IRO Managers 127. Specifically, in the preferred embodiment IRO Managers create and cache IROs for each thread of execution in an application. In particular, each time an address translation is performed, an IRO is created and cached by the IRO Manager corresponding to the current thread of execution.

For example, when JVM creates a transient object in the process-local address space, the JVM informs the IRO Manager 127 for that thread that a transient object has been created and passes the native address of the transient object to the IRO Manager 127. The IRO Manager then maps the transient object to a special portion of the shared address space reserved for process local storage. This mapping is preferably done such that the native address of the transient object can be extracted from the mapped SAS address of the transient object as needed. The IRO Manager 127 then creates an IRO 129 for the transient object and passes the native address of the IRO 129 back to the JVM. For persistent objects, when the JVM encounters a SAS address it requests an address translation from the IRO Manager 127. If an IRO for this address translation has not been previously created, the IRO Manager 127 then interacts with the virtual address translator 210 to translate the SAS address, creates a new IRO 129 that encapsulates the translation, caches the new IRO and passes the native address of the new IRO to the JVM.

The IRO Manager cache is preferably managed on a frame by frame basis (where a frame is generally defined as a unique execution context such as a method or procedure).

In particular, the IRO Manager cache is preferably implemented as a hashtable-stack hybrid, with IROs indexed in the IRO Manager cache by frame. When a new IRO is created, it is placed in the IRO Manager cache under the current frame with other IROs that have been created under that frame. These IROs remain in the IRO Manager cache until that frame is exited. When the JVM exits its frame all the cached IROs created within that frame are removed from the cache, but cached IROs created within previous frames remain in the IRO Manager cache.

With the IROs stored in the IRO Manager cache, they can be quickly located as needed. In particular, when the JVM requests an address translation, the hashtable property of the IRO Manager cache is utilized to quickly search the cache for an existing IRO that encapsulates the needed address translation. If such an IRO is not found in the IRO Manager cache, the IRO Manager interacts with the virtual address translator 210 to translate the SAS address. An IRO that encapsulates the new address translation is then created by the IRO Manager and put into its cache under the current frame. Finally, the address of the IRO is returned to the JVM.

It should be noted that in the preferred embodiment the SAS address of objects are used to when pointers to the objects are stored in objects. This provides for context independent addressing of these objects. Additionally, this provides the ability to recreate IRO's for transient objects when the IRO has been previously deleted on a frame exit. In particular, by using the SAS address of the transient object, a new IRO for the transient object can be recreated on demand.

For purposes of understanding the preferred embodiment, it is useful for the reader to visually conceptualize the levels of abstraction used in the preferred embodiment with a Java Virtual Machine. One level is the JVM implementation level. The JVM interprets the bytecodes resulting from the actions taken by the programmer and in response to these interpretations, calls methods on a variety of objects perform these actions. In the preferred embodiment the JVM needs no knowledge of the persistence mechanism and only needs to be able to perform bytecodes on the called objects. In particular, the JVM can be completely unaware of the details of the shared address space such as the pager and page cache. To the JVM, all objects reside in the 128 bit address shared address space.

In the preferred embodiment, the lowest level of abstraction is at the Intelligent Reference Object (IRO) level. The IRO has full knowledge of the details needed to implement shared address space on a system that uses 32 bit native addressing. For example, the IRO has full knowledge of the page cache and page reference counts used in conjunction with the paging function needed to bring data into the page cache from backing store.

Figure 3:
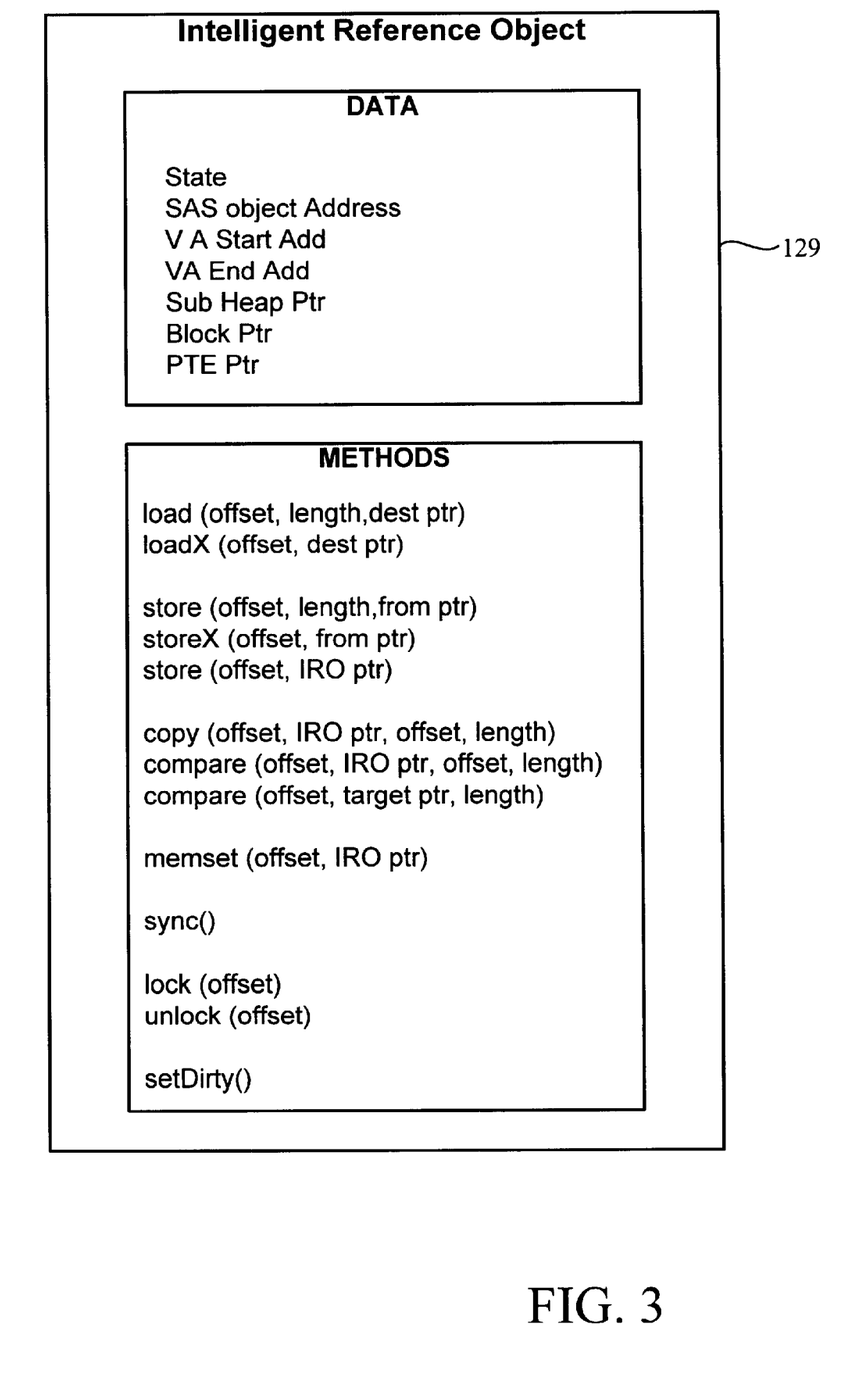
FIG. 3 is a schematic representation of an intelligent reference object.

Turning now to FIG. 3, a schematic representation of an intelligent reference object (IRO) 129 is shown. In the preferred embodiment, an IRO contains several types of data and defines several methods. Again, IROs for transient and persistent objects preferably shared the same interface, although with different implementations and creation mechanisms reflecting the different nature of their corresponding target objects. Additionally, the IROs for persistent objects preferably include additional data types not found in the transient object IROs as needed to interact with persistent objects.

In particular, in the preferred embodiment all IROs preferably include the SAS address, a VA Start address, a VA End address and a Sub Heap pointer. Persistent IROs additionally include a Block pointer and a PTE pointer.

The SAS address is the 128 bit address to the target object. For persistent objects, the VA Start address is a 32 bit byte aligned native address to the start of the target object in the page cache. For transient objects, the VA Start address is the 32 bit native address of the target object in process local storage. For persistent objects, the VA End address is a 32 bit byte aligned native address to the last byte in the persistent object addressable by this IRO without further translation. For transient objects, the VA End address is set to a special value that indicates the transient object is in process local storage. For both persistent object and transient object IROs, the Sub Heap pointer is a pointer to the heap of memory allocated for IROs.

For persistent object IROs, the Block pointer is a pointer to the next IRO that references an additional object data (for the persistent target object) stored in another page in the page cache. The PTE pointer is a pointer to the page table entry for the page of data containing the target object.

IROs for transient objects are preferably created whenever the virtual machine informs the IRO manager that it has created a transient object. When an IRO for a transient object is created, the passed native address is stored in the VA start address field. The transient object is then mapped to a portion of the process local storage in the SAS address space and this SAS address is stored in the SAS address field. The VA End address is set to a value that denotes that the object is in process local memory. The Sub Heap Ptr points to the memory heap from which the IRO is allocated. In the preferred embodiment, a heap of memory is allocated for all IRO's at start up. When a new IRO is needed, the next available portion of the allocated memory heap is used. When the IRO is destroyed, the memory is released back to the heap. This allows for IROs to be quickly created and destroyed as needed, improving the performance of the system.

IROs for persistent target objects are preferably created whenever address translations from shared address space to native addresses are requested. When an IRO for a persistent target object is created, the original 128 bit SAS address and the 32-bit byte aligned VA Start address for the persistent target object is stored in the IRO. Additionally, the PTE pointer is set to points to the page table entry for the page containing the persistent target object.

The VA End address is initially set to zero or some other value used to indicate that this IRO has not yet been used. Because the IRO does not initially know the size of the persistent target object, the VA End address is determined when the JVM accesses data inside the object. In particular, when data in the target object is accessed (e.g., using the load and store methods described below), the VA End address is set to point to the farthest known point of the object, except when it extends beyond the current page. In that case, the VA End address is set to the end of the current page in the page cache.

For persistent target objects, the Sub Heap Ptr again points to the memory heap from which the IRO is allocated.

For the persistent objects, the Block Ptr points to the IRO for next page in the page cache that contains data for the target object. If the persistent target object spans only the current page, or later pages containing target object data have not yet been brought into the page cache, the Block pointer is set to zero or some other unused value. In the preferred embodiment, the Block Ptr are kept ordered. For example, suppose the target object spans four pages. When the first page was brought in the Block Ptr in the corresponding IRO is set to zero. Suppose the next operation needs data from the fourth page. The fourth page would then be brought in, and an IRO created for the fourth page. The Block pointer in the original IRO would then be set to point to the IRO for the fourth page. Suppose then that the second page of target object data is brought in. In the preferred embodiment, the Block pointer in the first IRO would be updated to point to the second page IRO, and the second page IRO would be updated to point to the fourth page IRO. This procedure effective creates a list of IROs for the target object, allowing those IRO's to be quickly found as needed when the data is accessed again. It should be noted that in the for transient object IRO's, the Block Ptr is not needed as transient objects are always entirely in contiguous memory.

As stated above, in the preferred embodiment IROs for transient and persistent objects share the same interface, although with different implementations reflecting the different nature of their corresponding target objects. These methods preferably include the following: a load(offset, length, dest ptr) method, a loadX(offset, dest ptr) method (where X can be 1, 2, 4, 8 or 16 bytes), a store(offset, length, from ptr) method, a storeX(offset, from ptr) method (where X can be 1, 2, 4, 8 or 16 bytes), a store(offset, IRO ptr) method, a copy(offset, IRO ptr, offset, length) method, a compare(offset, IRO ptr, offset, length) method, a compare (offset, target ptr, length) method, a memset (offset, IRO ptr) method, a sync( ) method, a lock(offset) method, a unlock (offset) method and a setDirty( ) method. These methods provide the interfaces needed for the JVM and the shared persistent virtual storage system to interact with the IROs and persistent and transient target objects.

These methods are called by the JVM when needed. For example, when the JVM executes the getfield( ) bytecode, it will preferably call the appropriate load method on the IRO for the target object. The IRO then performs any internal operations needed to completed the access of the appropriate target object. In particular, if the target object is a normal transient object the IRO simply performs the operation needed to complete the field access. If the object is a persistent object residing in the shared address space, the IRO will have any needed pages of data not currently in the page cache brought in by the pager and then perform the field access. Thus, the IRO 129 serves to isolate the transient/persistent nature of objects from by the JVM by making workings of the shared persistent virtual storage system transparent to the JVM.

The load (offset, length, dest ptr) method can be used to get any length data string from the target object. In particular, when this method is called by the getfield( ) bytecode, data at an the specified offset and of the specified length is retrieved from the target object and loaded to the memory specified by the destination pointer, such as a place on the stack.

The load X (offset, dest ptr) methods are used to likewise used to get data from the target object, where X can be 1, 2, 4, 8 or 16 and specifies the number of bytes in the target data to be retrieved. Thus, load2(offset dest ptr) retrieves 2 bytes from the target at the specified offset. These methods are preferably used when retrieving data of standard sizes because they are typically faster than the load(offset, length, dest ptr) described above.

The store (offset, length, from ptr) and store X (offset, from ptr) are the complements of the methods above. These methods get data from the location specified by the from pointer and store that data in the target object at the specified offset. Again, X specifies the number of bytes stored in the target object. These methods would typically be called by the putfield( ) bytecode in the JVM.

The store (offset, IRO ptr) method is a specialized version designed to store 128 bit SAS addresses in the target objects. This method is typically preferred when a pointer to a second object (typically in the form of a pointer to an IRO of the second object) is to be stored in the target object. When this method is called, the IRO ptr parameter provides the 32 bit address of the IRO for the second object. The store method calls the IRO for the second object to get the full 128 bit SAS address for the IRO of the second object. This 128 bit address is then put in the target object. It should be noted that there is no corresponding special load command because the load16 described above can easily be used.

The memset (offset, size, IRO ptr) method can be used to quickly zero out a portion of memory. The method zeros out the portion of memory of the specified size at the specified offset in the target object corresponding to the IRO specified by the IRO pointer. This allows object data to be quickly zeroed without requiring the use of multiple store methods. There are several reasons why it may be desirable to zero out a portion of data, such as to assure that no spurious data is in a newly formed object, or assure that destroyed objects cannot be rebuilt.

The sync( ) method is used to synchronously write data in the page to backing store. This would be used by an application that wants to ensure that changed data is written to backing store, rather than relying on the virtual storage manager to write the data at an unspecified time. One example of this would be in transaction processing.

The copy(offset, IRO ptr, offset, length) method copies data of the specified length from the specified offset in the target object of the IRO specified by the IRO pointer to the specified offset of the target object of the current IRO. Of course, this copy function could be implemented in other ways.

The compare(offset, IRO ptr, offset, length) method compares data of the specified length from the specified offset in the target object of the IRO specified by the IRO pointer with data at the specified offset of the target object of the current IRO.

It should be noted that both the copy and compare methods described above will automatically bring in additional pages to the page cache as needed to perform these operations. This allows the details of the implementation of the persistent objects to be transparent to the JVM.

The compare(offset, target ptr, length) in contrast, is designed to compare data in the current target object to data that is known to be in memory using the native address.

The lock(offset) and unlock(offset) methods are used to lock (prevent other objects from reading and writing to the target object)and unlock (allow reading and writing) objects as needed. These methods are designed to work with the moniterenter( ) and moniterexit( ) JVM bytecodes. The lock method is preferably implemented to read the lock bit of the target object, compare the lock bit (to see if the target object is already locked), and write to lock the target object in one step. This prevents objects from getting a false unlock if they read in between another objects read and write of the target object lock bit.

The setDirty( ) method sets a dirty bit on the page table entry in the lookaside buffer when data in the target object contained in that page is changed. When the page is removed from the cache, this bit is examined, and if it is set, the data is copied back to the persistent storage. If not, it is discarded.

This method would typically be called as part of the store methods described above.

When a call is made on a target object to which the JVM 128 has only an SAS address, the JVM 128 first requests as address translation which returns a native address pointer to the IRO corresponding to the target object. With the address of the target object IRO, the JVM 128 can make the appropriate method call to the IRO to perform the initial method call.

Figure 4:
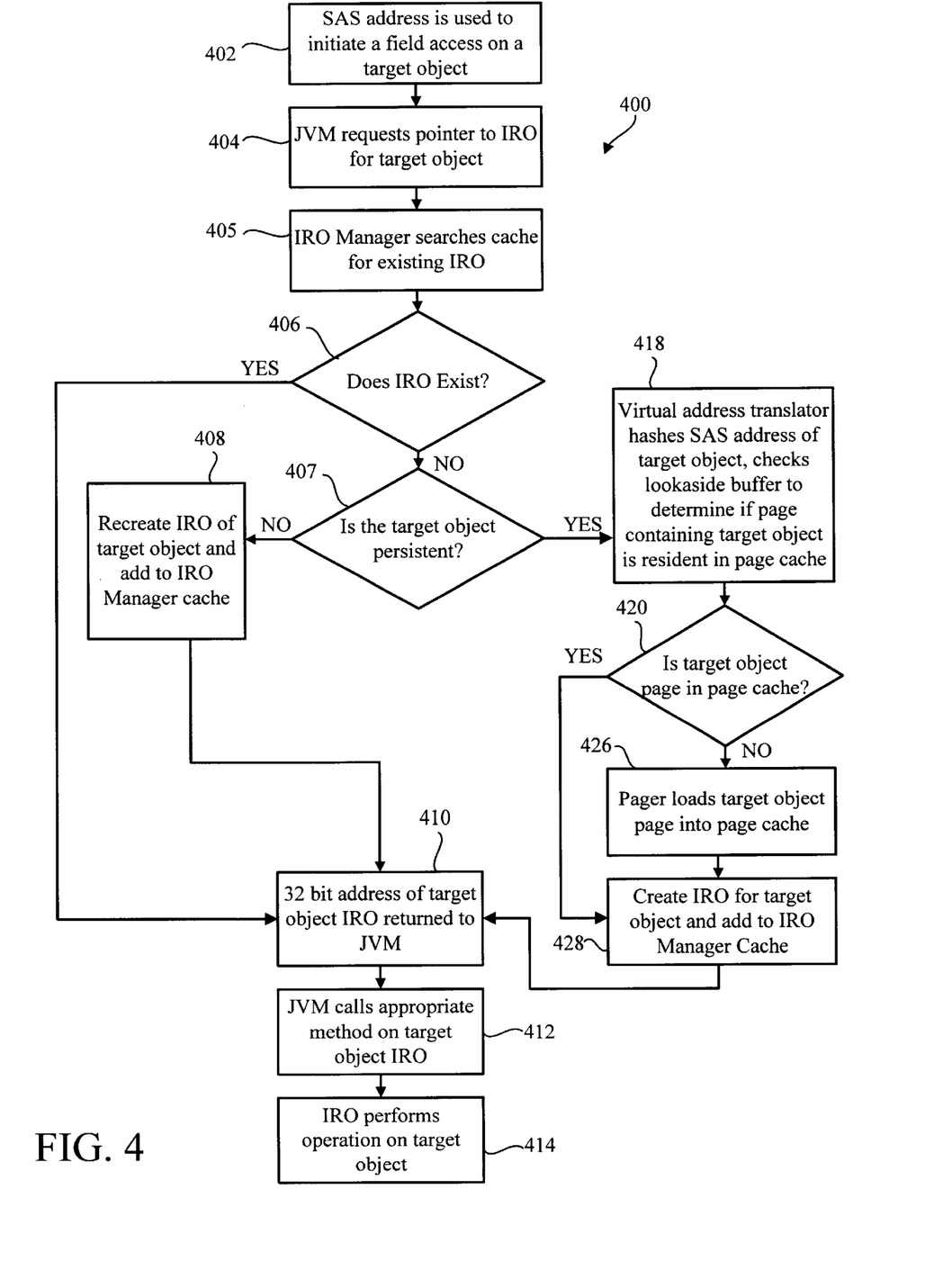
FIG. 4 is a flow diagram of a method in accordance with the present invention for using IROs to call methods on an object whose translation is encapsulated within an IRO.

Referring now to FIG. 4 a method 400 for directing field accesses on target objects in accordance with the preferred embodiment is illustrated. The first step 402 occurs when a SAS address is used to initiate a field access on a target object. This can be any type of field access call that typically occurs in object oriented programming, such as JAVA. In the preferred embodiment, a client object makes this field access call using a 128 bit SAS address. By writing a program to use 128 bit SAS addresses to reference target objects the programmer can take advantage of single level store semantics. Single level store semantics are desirable because they provide process independent addressing capability and persistent storage capability. In the preferred embodiment, all objects are referenced using the 128 bit SAS addresses, whether the objects are transient objects only used by this JVM or shared persistent objects that can be accessed by multiple JVMs.

The next step 404 is for the JVM to request a pointer to the IRO for the target object. In the preferred embodiment, whenever a 128 bit SAS address of a target object is encountered, the JVM calls on the virtual address translator to translate the 128 bit SAS address into a standard 32 bit address which the JVM can use to accesses the data on the object. In particular, the virtual address translator returns the 32 bit address of the IRO corresponding to the target object, with the IRO then serving as an intermediary between the JVM and the target object.

The next step 405 is to search for an existing IRO for the target object. In the preferred embodiment, this is done by having the IRO Manager for the current thread search its hashtable-stack hybrid cache of IROs which are indexed according to corresponding frame. If an IRO exists for the target object in the IRO Manager for the current thread, then decision step 406 leads to step 410. The next step 410 is to return the 32 bit address of the target object IRO to the JVM.

With the native address of the IRO delivered to the JVM, the next step 412 is for the JVM to call the appropriate method on the IRO to perform the desired field access. This can include any of the methods load, store, compare, copy, etc. described above. In step 414, the IRO performs the operation defined by the method on the target object.

For example, if the original method call is to get some data from the target object, the getfield( ) JVM bytecode could would call the appropriate load( ) method on the IRO. The IRO would then perform this method by getting the requested data from the target object and loading it in the requested space. Corresponding steps would be used to store data on the target object. In this way the IRO provides the interface between the JVM and the target object.

Returning back to decision step 406, if an IRO for the target object did not exist in the IRO Manager cache for the current thread, the next step is decision step 407 to determine if the target object is persistent. As discussed above, all transient objects are mapped to a portion of the SAS address space reserved for process local storage. Thus, if a target object has a SAS object is in the process local storage it is a transient object, if not it is a persistent object.

If the target object is transient, the next step 408 is to recreate IRO for the transient target object. As described above, all transient objects are mapped to a special portion of the shared address space reserved for process local storage. To recreate the IRO for such a transient object, the SAS address of the transient object is delivered to the IRO Manager. The IRO Manager can the recreate an IRO for the transient object by taking the SAS address and extracting the 32 bit native address.

Figure 5:
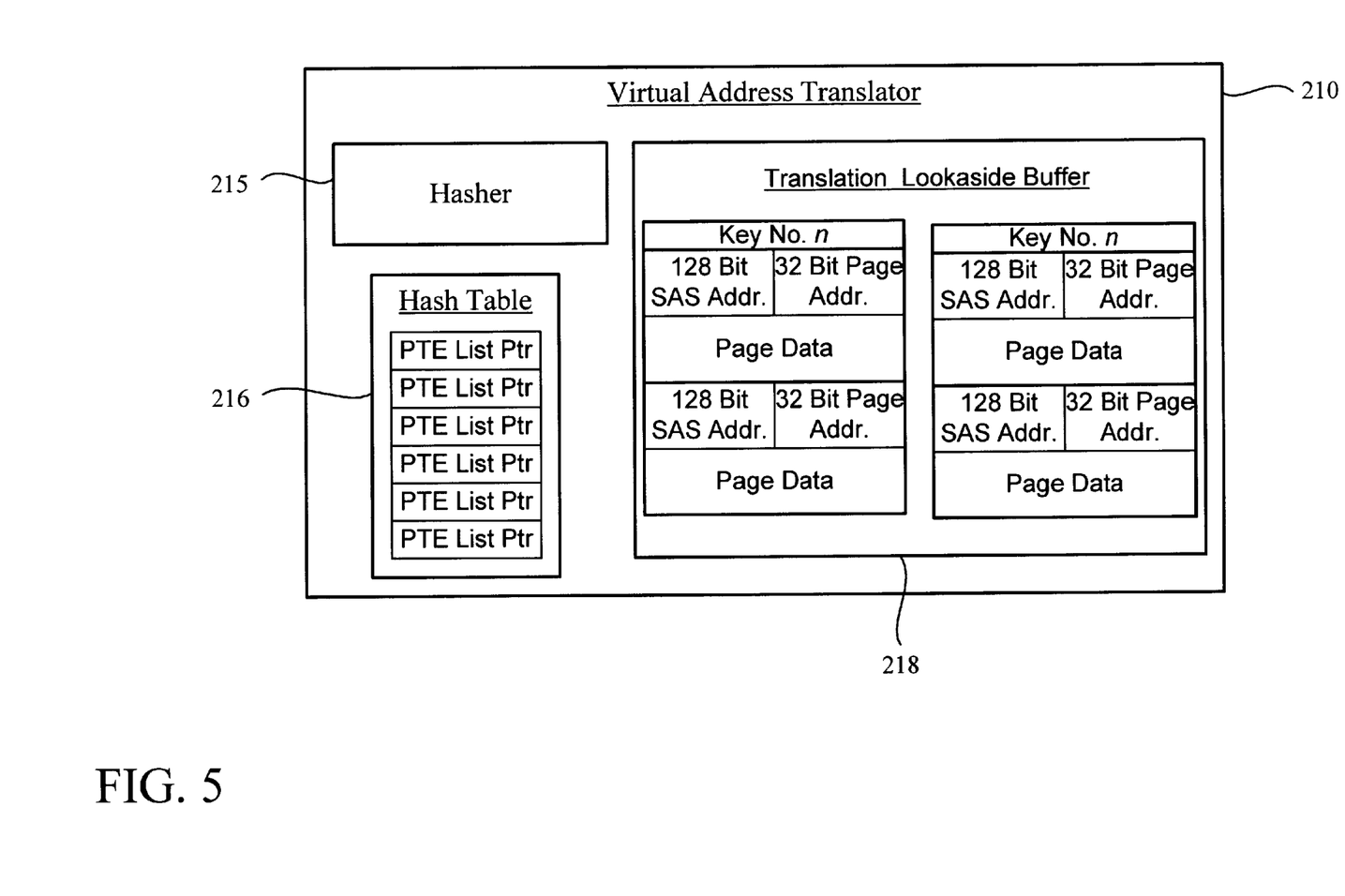
FIG. 5 is a schematic diagram illustrating a virtual address translator in accordance with the preferred embodiment.

Returning back to decision step 407, if the target object is a persistent object, it may or may not be in the page cache. The next step 418 is to check the virtual address translator to determine if the page containing the target object is in the page cache. This is preferably done by having the virtual address translator hash the 128 bit SAS address and checking the lookaside buffer to determine if the page containing the persistent object is in the page cache. The hash table and translator lookaside buffer are used to quickly determine if the data corresponding to a requested 128 bit SAS address is currently contained in the page cache. Turning briefly to FIG. 5, the preferred embodiment virtual address translator 210, with the hasher 215, hash table 216 and lookaside buffer 218 illustrated in more detail.

Hashing is a known method for quickly indexing and retrieving data using key numbers. In the preferred embodiment, the hasher 215 takes the 128 bit SAS address and produces a key number n corresponding to that 128 bit addresses using any known hashing technique. The key number n can be used to index data in the hash table 216 In particular, in the preferred embodiment many 128 bit addresses hash to the same key number n. Key numbers can thus be used to quickly reference lists of active addresses translations (contained in page table entries in the translator lookaside buffer 218), with each list corresponding to a one key number n.

The hash table 216 preferably comprises a table containing pointers to lists of page table entries in the lookaside buffer corresponding to that key number n. Thus given the key number n from hasher 215 for a particular 128 bit address, the hash table 216 can provide a pointer to the list of page table entries in the translator lookaside buffer 218 corresponding to that key number n.

The translator lookaside buffer 218 preferably comprises several lists of page table entries, with each list corresponding to a key number n, and each page of data in the page cache having a unique page table entry. Each page table entry includes the SAS address for the corresponding page, the 32 bit page aligned address of the page in the page cache, and other page state data as necessary. In the preferred embodiment, each page in the page cache comprises 4096 bytes of data.

Returning to method 400, step 418 preferably comprises having the hasher on the virtual address translator hash the SAS address and return a key number n. The key number n is then used to index a hash table to locate a pointer to the page table entry list in the lookaside buffer corresponding to that key number. That relatively short list can then be quickly searched for the desired page table entry and the 32 bit native address of the data in the page cache. Thus, the hasher 215, the hash table 216 and the lookaside buffer 218, are used to quickly locate which page in the page cache, if any, contains the data corresponding to the 128 bit SAS address.

If the page containing the target object is resident in the page cache, the next step 428 is to create an IRO for the persistent target object. Again, this is preferably done by the IRO Manager for the current thread.

This is preferably done by retrieving the 12 low order bits of the 128 bit SAS address, and using those 12 low order bits to determine the offset into the page in the page cache where the target object begins. In the preferred embodiment, these 12 low order bits were stored in a system buffer when the page was first referenced using the top 116 bits. The 12 low order bits are then added to the 32 bit address of the page in the page cache. The resulting 32 bit address is the byte aligned address of the target object in the page cache.

Memory is then allocated for the new IRO. In the preferred embodiment, a heap of memory is allocated to contain all instances of the IRO. When a new IRO is needed, the next available portion of the allocated memory heap is used. When the IRO is destroyed, the memory is released back to the heap. This allows for IROs to be quickly created and destroyed as needed, improving the performance of the system. As described previously, a Sub Heap Ptr in the IRO points to the memory heap where the IRO is stored.

With the memory allocated for the new IRO, the IRO is initialized by placing the 128 bit SAS byte aligned address and the 32 bit byte aligned native address of the target object in the IRO.

The reference counter for the page table entry corresponding to the page containing the target object is then incremented to reflect the new IRO using that page. By keeping track of IROs referencing objects in the page cache, space in the page cache can be effectively optimized by only keeping pages in the cache which are actively being used. When a page is unused for a predetermined period of time, the pager copies the updated page data to the backing store and frees that slot in the page cache.

With the target object IRO created, the next steps are the same as with normal transient objects. In particular, the next step 410 is to return the 32 bit address of the target IRO to the JVM. In step 412, with the 32 bit address to the IRO, bytecodes in the JVM can call the appropriate method on the IRO. In step 414, the IRO performs the operation defined by the method on the target object.

Returning to decision step 420, if the target object was not found in the page cache, the next step 426 is load the page containing the target object into the page cache. In particular, the pager locates a free portion of the page cache, and copies the desired page of data (i.e., the 4096 bytes of data corresponding to the top 116 SAS address bits) from backing storage into the page cache.

To locate the needed page of data in backing storage the pager first locates the cohort data structure corresponding to the SAS address. From the cohort data structure a pointer to the block data structure for the block containing the desired page is obtained. From the block data structure the actual location of the page in the backing store can be obtained. For example, the block data structure can include the name of a file containing that block and the offset into that file which contains the desired page. From this, the file system can retrieve the desired page and copy it into the page cache.

A page table entry corresponding to the new page in the cache is then created in the translator lookaside buffer. This new page table entry includes the SAS address of this data and the 32 bit address of the new page in the cache.

The next step 426 is to again create a new IRO for the target object now in the page cache. Again, this is preferably done by the IRO Manager for the current thread. The IRO Manager gets the 32 bit address of the target object in the page cache and places that in an IRO along with the original SAS address of the target object. The reference counter for the page table entry corresponding to the page containing the target object is then incremented to reflect the new IRO using that page.

With the target object IRO created, the next steps are the same as with normal transient objects. In particular, the next step 410 is to return the 32 bit address of the target IRO to the JVM. In step 412, with the 32 bit address to the IRO, bytecodes in the JVM can call the appropriate method on the IRO. In step 414, the IRO performs the operation defined by the method on the target object. In this way, the IRO hides the implementation differences between transient objects and persistent objects (whether currently in the page cache are not). Thus, the details of the persistent object system are transparent to the JVM.

Figure 6:
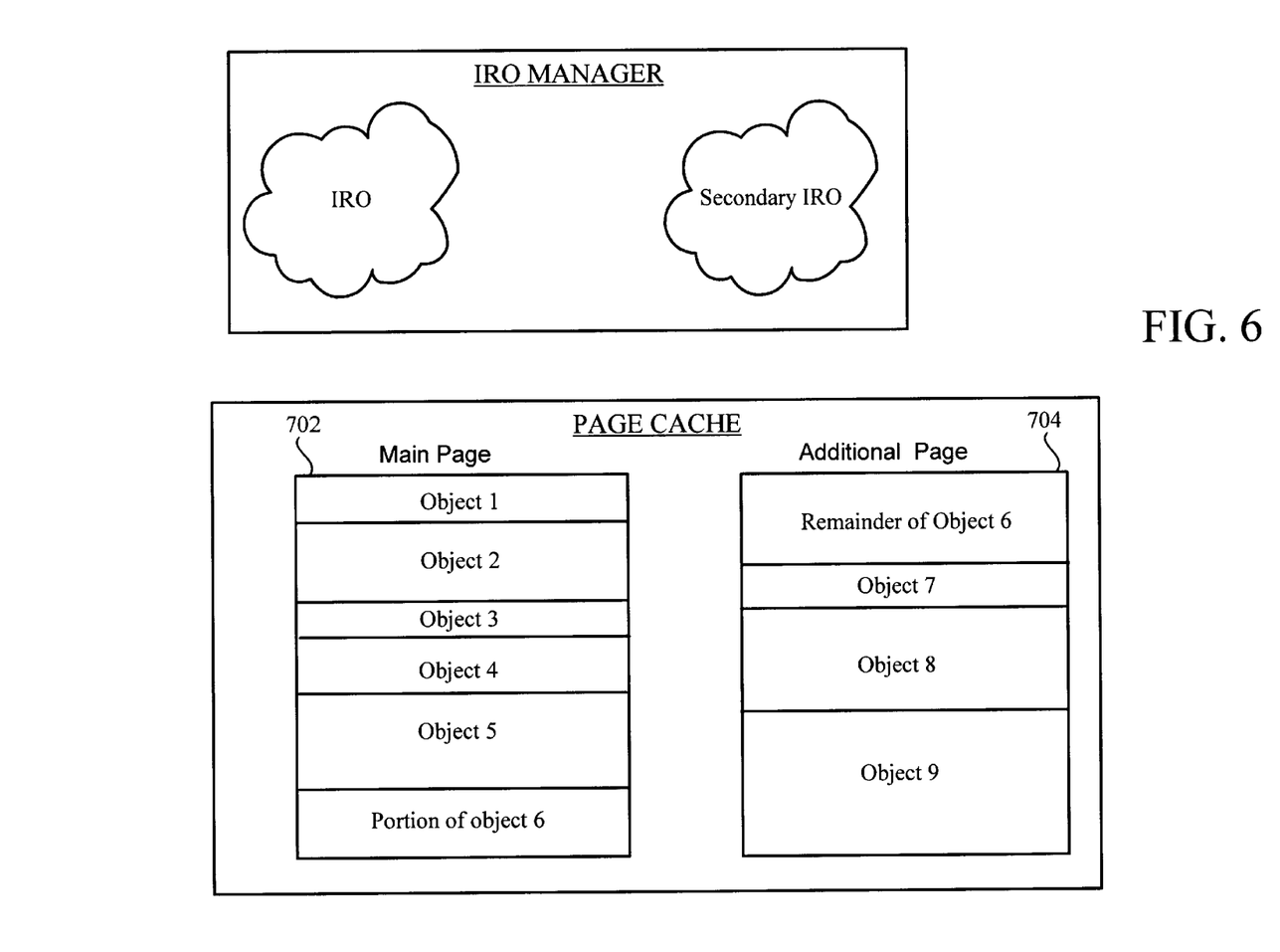
FIG. 6 is a schematic diagram illustrating an additional feature of the preferred embodiment of the present invention.

As discussed previously, in some cases the persistent target object spans multiple pages of the shared address space. Turning now to FIG. 6, two 4096 byte pages are shown, 702 and 704, respectively. First page 702 contains six objects, object 1 through object 5 are completely contained within first page 702. However, only a portion of object 6 is contained within first page 702. The remaining portion of object 6 is stored in second page 704. As previously mentioned, when an IRO method requires data not stored in the main page, a page fault occurs and those additional pages are brought into the page cache and additional secondary-IRO's are created to reference data in the additional pages. Thus, when data is needed from the remaining portion of object 6, the secondary IRO is called by the main IRO to perform the functions as needed.

For example, that the first page has been loaded into memory and the main IRO created. A load( ) method is then called on the main IRO with an offset extending past the page boundary. When the IRO recognizes that the offset extends beyond the current page, the IRO calls the pager to bring the additional page into the page cache, a secondary IRO is then created to reference the second portion of the object. The load( ) method on the main IRO then calls a load( ) method on the second IRO with the correct offset to specify the desired data, and the data is returned to the JVM. This process occurs whenever object data that extends beyond the original page is needed. This entire process is transparent to the JVM.

Thus, the preferred embodiment of the present invention provides a shared persistent virtual storage system for addressing data using a large shared address space on commodity systems and an intelligent reference object for encapsulating the address translation. This system facilitates the creation, storage and retrieval of persistent objects using SAS addresses in a way that is transparent to the client processes.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:
   at least one processor;
   a memory coupled to the at least one processor;
   an address translation encapsulator residing in the memory, said address translation encapsulator including an address translation for data between a large shared address space address and a relatively smaller native address space, the address translation encapsulator further including an intelligent reference object having a plurality of methods for making field access to a corresponding target object.

2. The apparatus of claim 1 wherein the intelligent reference object includes a native address of the target object in a page in a page cache.

3. The apparatus of claim 2 wherein the intelligent reference object includes a pointer to a page table entry for the page containing the target object in the page cache.

4. The apparatus of claim 3 wherein the intelligent reference object includes a method for locking the target object in the page cache and a method for unlocking the target object in the page cache.

5. The apparatus of claim 2 wherein the intelligent reference object includes a method for setting the page containing the target object in the page cache as dirty.

6. The apparatus of claim 2 wherein the intelligent reference object includes a block pointer to address a secondary intelligent reference object where the target object extends to a second page in the page cache.

7. The apparatus of claim 1 wherein the target object comprises a persistent object.

8. The apparatus of claim 1 wherein the target object comprises a transient object.

9. The apparatus of claim 1 wherein the plurality of methods for making field accesses include load and store methods.

10. The apparatus of claim 1 wherein the plurality of methods for making field accesses include copy and compare methods.

11. The apparatus of claim 1 wherein the intelligent reference object provides address translation for target objects created by an interpreted language residing in a virtual machine.

12. A program product comprising:
(A) an address translation encapsulator including an address translation for data between a large shared address space address and a relatively smaller native address space, the address translation encapsulator further including an intelligent reference object, the intelligent reference object including a plurality of methods for making field accesses to a corresponding target object; and
(B) signal bearing media bearing the address translation encapsulator.

13. The program product of claim 12 wherein the signal bearing media comprises recordable media.

14. The program product of claim 12 wherein the signal bearing media comprises transmission media.

15. The program product of claim 12 wherein the intelligent reference object includes a native address of the target object in a page in a page cache.

16. The program product of claim 15 wherein the intelligent reference object includes a pointer to a page table entry for the page containing the target object in the page cache.

17. The program product of claim 15 wherein the intelligent reference object includes a method for setting the page containing the target object in the page cache as dirty.

18. The program product of claim 17 wherein the intelligent reference object includes a method for locking the target object in the page cache and a method for unlocking the target object in the page cache.

19. The program product of claim 15 wherein the intelligent reference object includes a block pointer to address a secondary intelligent reference object where the target object extends to a second page in the page cache.

20. The program product of claim 12 wherein the target object comprises a persistent object.

21. The program product of claim 12 wherein the target object comprises a transient object.

22. The program product of claim 12 wherein the plurality of methods for making field accesses include load and store methods.

23. The program product of claim 12 wherein the plurality of methods for making field accesses include copy and compare methods.

24. The program product of claim 12 wherein the intelligent reference object provides address translation for target objects created by an interpreted language residing in a virtual machine.

* * * * *